US006196462B1

(12) United States Patent
Boersma

(10) Patent No.: US 6,196,462 B1
(45) Date of Patent: Mar. 6, 2001

(54) OPTICAL DEVICE FOR READING AND DECODING BARS OF DIFFERENT REFLECTIVITY ARRANGED IN ACCORDANCE WITH A BARCODE AND ADJOINING ONE ANOTHER

(75) Inventor: Gerrit Boersma, Odijk (NL)

(73) Assignee: Scantech B.V., Amersfoort (NL)

( * ) Notice: Subject to any disclaimer, the term of this patent is extended or adjusted under 35 U.S.C. 154(b) by 0 days.

(21) Appl. No.: 09/309,562

(22) Filed: May 12, 1999

(30) Foreign Application Priority Data

May 13, 1998 (NL) .................................................. 1009156

(51) Int. Cl.[7] .................................................. G06K 7/10
(52) U.S. Cl. .................................. 235/462.25; 235/462.16
(58) Field of Search ........................ 235/462.01, 462.16, 235/462.25

(56) References Cited

U.S. PATENT DOCUMENTS

| 4,000,397 | 12/1976 | Hebert et al. . |
| 5,059,779 | 10/1991 | Krichever et al. . |
| 5,124,539 | 6/1992 | Krichever et al. . |
| 5,142,130 | 8/1992 | Sato . |
| 5,200,599 | 4/1993 | Krichever et al. . |
| 5,408,081 | 4/1995 | Barkan . |
| 5,436,440 | 7/1995 | Barkan . |
| 5,446,272 | 8/1995 | Barkan . |
| 5,504,316 | 4/1996 | Brigelall et al. . |
| 5,545,888 | 8/1996 | Barkan et al. . |
| 5,581,072 | 12/1996 | Brigelall et al. . |
| 5,612,531 | 3/1997 | Barkan . |
| 5,619,028 | 4/1997 | Barkan . |
| 5,637,856 | 6/1997 | Brigelall et al. . |
| 5,686,717 | * 11/1997 | Knowles et al. ................ 235/462.16 |
| 5,691,528 | 11/1997 | Wyatt et al. . |
| 5,705,799 | 1/1998 | Li . |
| 5,783,813 | 7/1998 | Metlitsky et al. . |
| 5,821,521 | 10/1998 | Brigelall et al. . |
| 5,861,615 | 1/1999 | Brigelall et al. . |

FOREIGN PATENT DOCUMENTS 427528   5/1991   (EP) .

* cited by examiner

*Primary Examiner*—Harold I. Pitts
(74) *Attorney, Agent, or Firm*—Greenblum & Bernstein, P.L.C.

(57) ABSTRACT

Optical device for reading and decoding bars of different reflectivity arranged in accordance with a barcode and adjoining one another, comprising an optical scanning device for scanning the bars by means of a light beam, a sensor for receiving the reflected light beam and the conversion thereof into an electrical sensor output signal, a transition detector for detecting the level transitions in the sensor output signal and a decoding device which decodes the scanned barcode on the basis of the output signals from the transition detector. The transition detector is provided with a comparator and a flipflop connected to the output thereof. The sensor output signal is fed to one of the inputs of the comparator. The output of the flipflop is coupled via at least a number of first integrators to the other input of the comparator. The transition detector also comprises one or more second integrators connected to the output of the flipflop and a device, connected to said second integrators, for determining the positions of the transitions in the barcode.

13 Claims, 3 Drawing Sheets

$f_{sys}/32$

OPTICAL DEVICE FOR READING AND DECODING BARS OF DIFFERENT REFLECTIVITY ARRANGED IN ACCORDANCE WITH A BARCODE AND ADJOINING ONE ANOTHER

BACKGROUND OF THE INVENTION

The invention relates to an optical device for reading and decoding bars of different reflectivity arranged in accordance with a barcode and adjoining one another, comprising an optical scanning device for scanning the bars by means of a light beam, a sensor for receiving the reflected light beam and the conversion thereof into an electrical sensor output signal, a transition detector for detecting the level tansitions in the sensor output signal and a decoding device which decodes the scanned barcode on the basis of the output signals from the transition detector.

A device of this type, in which the path from sensor to transition detector has been designed in analogue electronics, is generally known.

In practice the optical readers for reading and decoding barcodes are frequently confronted by a problematically low signal-to-noise ratio, in particular in the case of poorly printed barcodes and in the case of reading close to the edge of the read area. It is then not easy accurately to determine the transitions. These transitions are frequently determined by determining the peaks of the first derivative of the sensor output signal.

OBJECTS OF THE INVENTION

The aim of the invention is to provide a device of the type mentioned in the preamble, with which, despite a poor signal-to-noise ratio of the sensor output signal, the reliability of the determination of the transitions can be improved in a simple manner and with which the costs of the device are restricted to a minimum.

A step in the right direction would be digitising using an analogue-to-digital converter, for example a fast ADC (analogue-to-digital converter). However, a component of this type also comes at a price because of the required speed, as a result of which dissipation is also a problem.

SUMMARY OF THE INVENTION

The stated objective is achieved according to the invention in that the transition detector is provided with a comparator and a flipflop connected to the output thereof, the sensor output signal being fed to one of the inputs of the comparator and the output of the flipflop being coupled via one or more first integrators to the other input of the comparator, one or more second integrators connected to the output of the flipflop and a device, connected to said second integrators, for determining the positions of the transitions in the barcode.

In principle, with this device use is made of a so-called bit stream converter which consists of the abovementioned comparator, flipflop and first integrators. Second integrators. preferably digital integrators, are connected to the output of the bit stream converter (of the flipflop).

In one embodiment the sensor output signal is fed to the comparator and the number of first integrators is equal to the number of second integrators, so that the sensor output signal is produced at the output of the last of the second integrators. A first derivative signal can be generated from said sensor output signal, it being possible to determine the positions of the transitions in the barcode from the maxima and minima of said first derivative signal.

In another embodiment two first integrators and one second integrator are used, it then no longer being necessary to use a device which generates a first derivative signal. The first derivative signal can be taken off at the output of the second integrator, the positions of the transitions in the barcode being determined from the maxima and the minima of said first derivative signal.

Preferably, the sensor output signal is fed to the comparator via a first derivative device, which generates a first derivative signal from the sensor output signal. If the number of first integrators is equal to the number of second integrators a first derivative signal is thus produced at the output of the second integrators. This arrangement has the advantage that the large dynamic range of the sensor signal as a consequence of ambient light is much less troublesome.

Further embodiments of the invention are described in the dependent claims.

BRIEF DESCRIPTION OF THE DRAWINGS

The invention will be explained in more detail below with reference to the drawings In the drawings

DESCRIPTION OF THE PREFERRED EMBODIMENT

In a known optical scanning device or laser scanner a fixed line pattern is written with a laser beam by means of a system of lenses and mirrors, including mirrors which are attached to the shaft of a motor and rotate therewith. When the laser beam impinges on an object, for example a barcode, some of the light is reflected diffusely. Some of this reflected light is projected by means of a system of lenses and mirrors, which operates in the converse manner, onto a sensor, for example in the form of a photodiode. In the last-mentioned system of lenses and mirrors use is largely made of the abovementioned mirrors which are used to generate the scanning line pattern, including the rotary mirrors. The quantity of light which impinges on the sensor at a given point in time is thus a measure of the reflectivity of the object at the location of the laser spot.

The optical scanning device which has been briefly described above is generally known and the invention is more particularly aimed at the received portion of the reflected light. Therefore, it can suffice here to refer to the prior art for the implementation of the scanning device.

Figure 1:
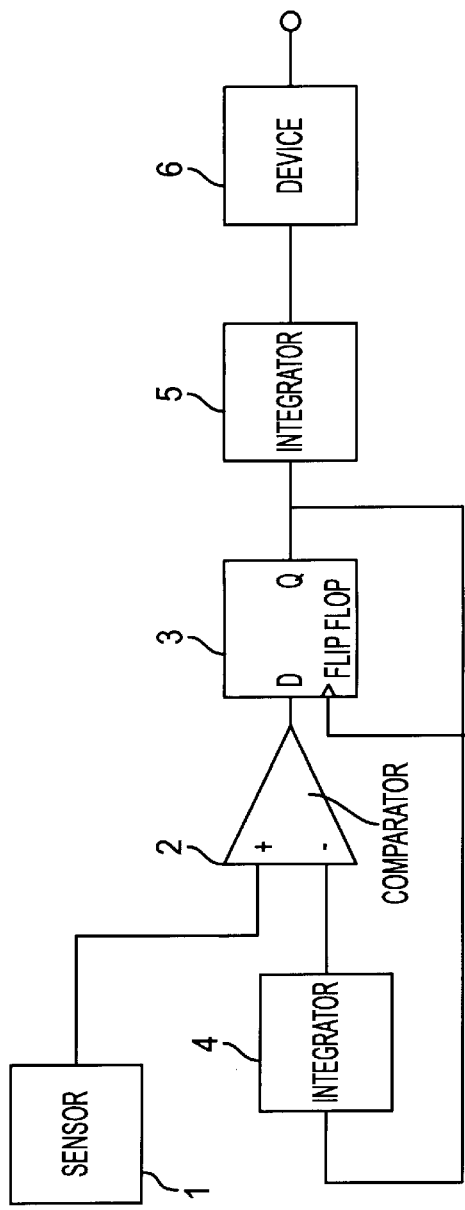
FIG. 1 shows a block diagram of one embodiment of the digital transition detector according to the invention.

The block diagram of one embodiment of a transition detector according to the invention, which advantageously can be used in an optical reading and decoding device for barcodes, is shown in FIG. 1. The light beam reflected by the barcode impinges on the sensor 1 and is converted by said sensor into an electrical signal, said sensor output signal being a fiction of the quantity of light which has been received by the sensor as a function of time. Said sensor output signal is amplified, if appropriate, and converted into an electrical voltage and then fed to one of the inputs of the comparator 2. The output of said comparator 2 is connected to the input D of the flipflop 3. Said flipflop 3 is controlled by means of the clock signal c. The output Q of the flipflop 3 is fed via a number of first integrators, only one first integrator 4 of which is indicated as an example in FIG. 1, to the other input of the comparator 2. The comparator 2, the flipflop 3 and the integrator 4 form a so-called bit steam converter. Under some circumstances one integrator is sufficient, but in other cases it is preferable to use two or more integrators connected in series, for example when even better resolution is desired.

The output of the flipflop 3 is also connected to the input of a number of second integrators 5, only one second integrator 5 of which is shown as an example in FIG. 1.

If the number of first integrators 4 is equal to the number of second integrators 5, a signal that matches the sensor output signal as closely as possible is produced at the output of the second integrator(s) provided sizing is good. Said sensor output signal is fed to the device 6, which determines the positions of the transitions in the barcode. Said device can, for example, consist of a first derivative device, which forms a first derivative signal from the sensor output signal, the maxima and minima of which first derivative signal represent the positions of the said transitions in the barcode.

If, however, for example, two first integrators 4 and one second integrator 5 are used, the first derivative of the sensor output signal is produced at the output of the second integrator 5. With his embodiment a first derivative device is thus no longer needed. The maxima and minima of the output signal from the second integrator then represent the positions of the transitions in the barcode.

A consequence of the influence of, inter alia, the ambient light is that the sensor output signal has a broad range, This influence can be avoided by, preferably, first generating the first derivative from the sensor output signal by means of, for example, a differentiator. If the number of first integrators 4 is equal to the number of second integrators 5, a first derivative signal, from which the positions of the transitions in the barcode can be detected, is thus produced at the output of the last integrator 5.

If two or more first integrators are used it is preferable to use a summing device between every two successive integrators. The output of the preceding integrator is connected to one of the inputs of the summing device, whilst the output of the summing device is connected to the input of the subsequent integrator. The other input of the summing device is once again connected to the output Q of the flipflop 3.

Figure 2:
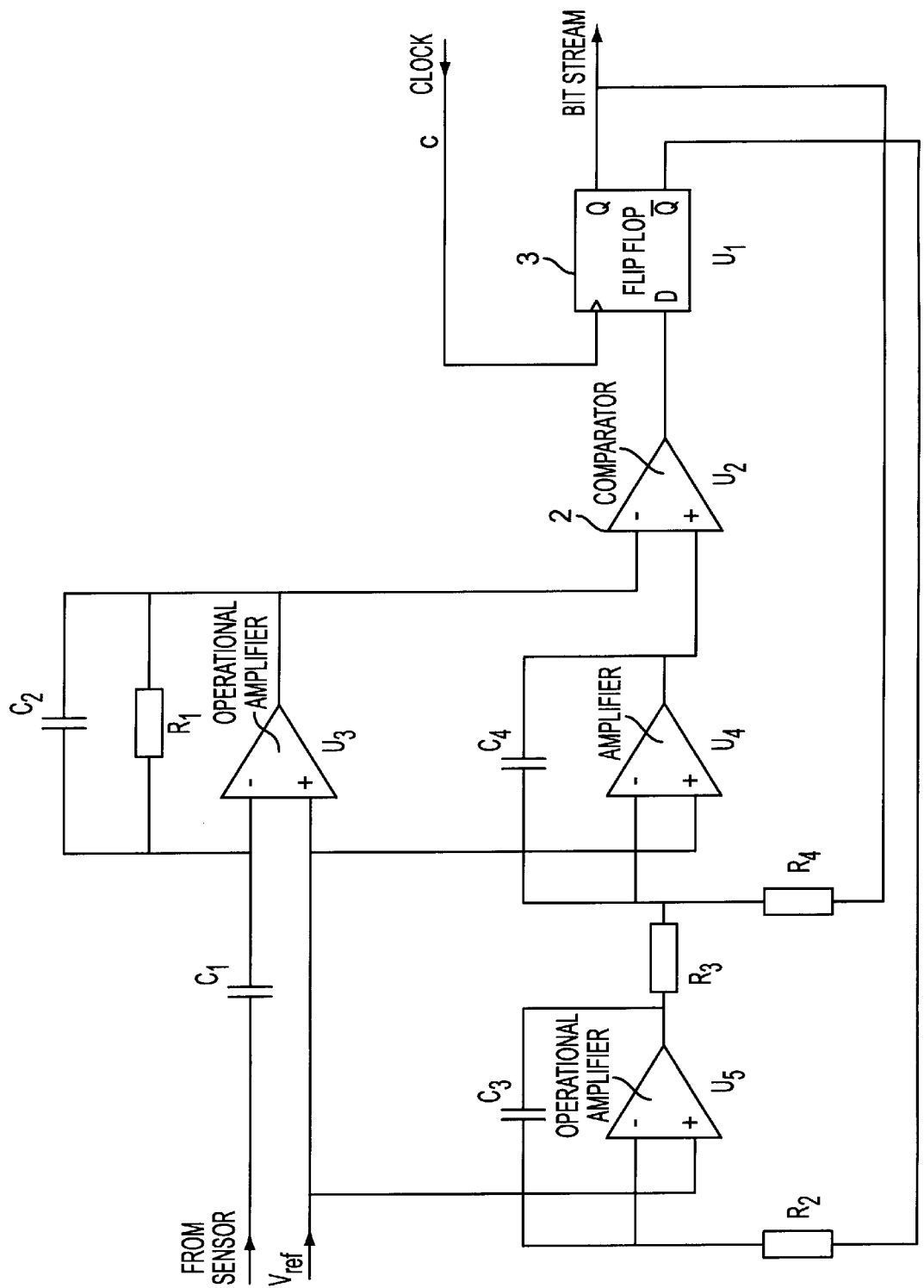
FIG. 2 shows a further development of a bit stream converter with two integrators.

FIG. 2 shows an example of a bit stream converter with two integrators, as well as a differentiator for generating the first derivative signal from the sensor output signal. The embodiment shown in FIG. 2 comprises a differentiator with a high frequency crossover point, consisting of an operational amplifier $U_3$, the capacitors $C_1$ and $C_2$ and the resistance $R_1$. The sensor output signal, which has been amplified if appropriate, is fed to the capacitor $C_1$. The first derivative signal that has been derived from the sensor output signal is then produced at the output of the operational amplifier $U_3$. According to the FIG. 2, the bit stream converter consists of two first integrators, one of which consists of the operational amplifier $U_5$, the resistance $R_2$ and the capacitor $C_3$. The other integrator consists of the amplifier $U_4$ and the capacitor $C_4$. The summing device between the integrators then consists of the resistances $R_3$ and $R_4$. The outputs of the amplifiers $U_3$ and $U_4$ are fed to the comparator 2, the output of which is connected to the input D of the flipflop 3. The clock signal c is once again fed to the clock input of the flipflop 3. The $\overline{Q}$ output of the flipflop 3 is fed via the resistance $R_2$ to the input of the first integrator $U_5$, $C_3$. The Q output of the flipflop 3 is connected via the resistance $R_4$ to the input of the other first integrator $U_4$, $C_4$.

The flipflop is clocked at, for example, 32 MHz. A bit steam issues from the flipflop, which is where the name bit stream converter comes from. Thus, there is only one bit at each sampling instant.

The intention is that the two signals at the inputs of the comparator 2 are virtually identical. If the signals are identical or in any event if the signal from the second integrator is sufficiently similar to the signal from the differentiator to differentiate the flanks of the barcode therefrom, the bit stream then thus contain all the information required and digitising has therefore been achieved.

The degree to which the two signals at the inputs of the comparator are identical, or the resolution, depends on the sizing of the circuit Firstly, the clock frequency of the flipflop and secondly the values of the resistances and the capacitors are of importance. It is essential that the integrators are able to follow the signal from the differentiator.

If the bit stream which is produced at the output of the embodiment shown in FIG. 2 is fed to two second integrators connected in series, the output signal from the last second integrator represents the first derivative of the sensor output signal, Said last-mentioned signal can be fed to a peak detector. In its simplest form the peak detector takes the location of the highest sampling value as the transition in the sensor output signal.

Figure 3:
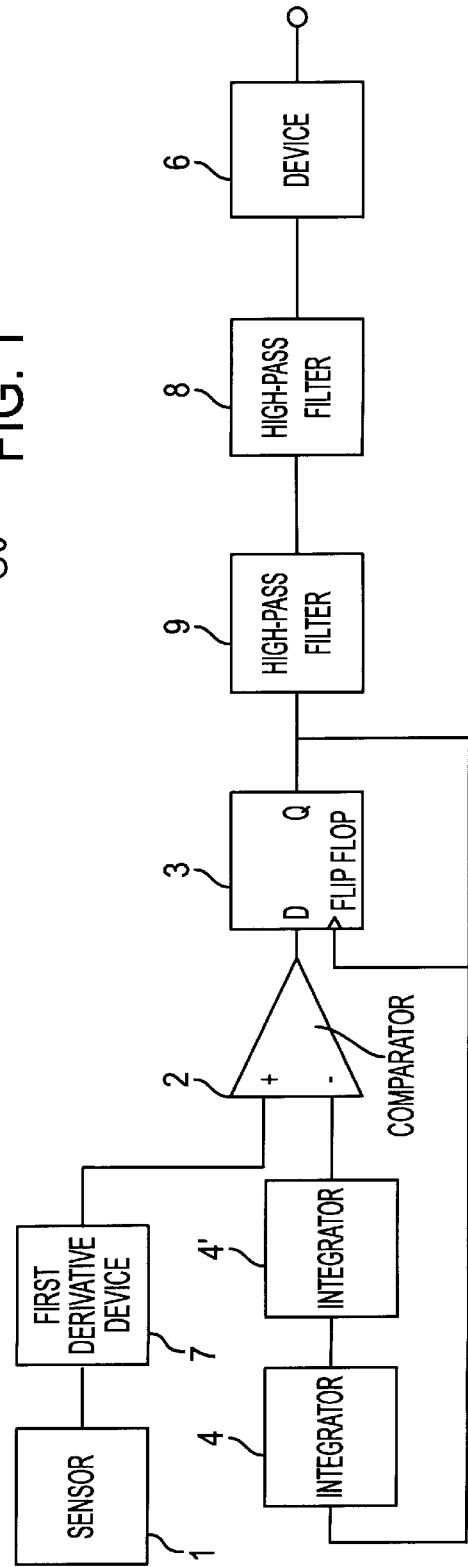
FIG. 3 shows a block diagram of an embodiment of the transition detector according to the invention which is preferably to be used.

An embodiment of a transition detector in which few components are needed is shown in FIG. 3.

The output signal from the sensor 1 is fed via a first derivative device 7 to the +input of the comparator 2, whilst the output of the comparator 2 is connected to the flipflop 3. The output of the flipflop 3 is fed back to the other—input of the comparator 2 via two integrators 4 and 4'. The flipflop 3 is controlled by the clock signal c that is added at the input thereof. The components 2, 3, 4, 4' and 7 can be implemented as shown in FIG. 2.

The output signal from the bit stream converter (output Q of the flipflop 3) must be integrated twice (second integrators) in order to obtain the first derivative of the signal from the sensor 1. If no measures, such as the summing device described above, are taken, such a double integration is unstable. However, it is preferable to select a high-pass filter 9 for the two integrators, as shown in FIG. 3. An additional summing device is then not necessary and the circuit is prevented from running out of control. Apart from the simplicity of the high-pass filter, this also has the advantage of little offset, which can be of importance for peak detection.

If the high-pass filter is of the third order, the output signal will on average be zero after double integration, irrespective of the average percentage of ones in the bit stream. This is of importance for the peak detector.

Although there are various other possibilities for the high-pass filter, a high-pass filter of the Butterworth type of the third order is preferred. This filter has advantageous frequency characteristics and its implementation is straightforward. The transfer is described in the following equation:

$$Z(\omega)=X(\omega)j\omega/(-j\omega^3-2\omega^2\omega o+2j\omega o^2+\omega o^3)$$

In the equation X is the input signal, Z the output signal and X the crossover point of the filter.

It can be seen from the equation that frequencies well above the crossover point are integrated twice. It can also be seen that the offset does not pass through the filter, an important requirement thus being met.

The location of the crossover point is critical and therefore is preferably made adjustable by software. If the point is too high, barcodes which are close to the scanner window, where the spot speed is the lowest, are difficult to decode. If on the other hand, the point is too low it takes longer for the filter to have transient decayed after start-up. Furthermore, the output signal from the integrator oscillates somewhat more widely about zero, as a result of which barcodes with low contrast are more difficult to decode.

The setting of the crossover point also influences the amplification factor of the filter. In order to compensate for this and to be able to make optimum use of the range of internal variables, scaling of the input signal is used. The sing is, for example, adjustable.

It is pointed out that it is also possible not to feed the sensor output signal via the first derivative device 7 but to feed said signal directly to the +input of the comparator. Only one integrator is needed on the output of the flipflop 3 in order to obtain the first derivative signal of the sensor output signal. If, for example, a high-pass filter 8 is used, said first derivative signal can be taken off after the first integrator of the high-pass filter 8.

As is shown in FIG. 3, the output signal from the flipflop 3 is not fed directly to the integrating high-pass filter 8 but is fed to said filter via a low-pass filter 9. This insertion of the low-pass filter has the advantage that, firstly, frequency components higher than the highest frequency which is still of interest are thus filtered out. Secondly, a low-pass filter contributes to the resolution of the system as a consequence of the averaging effect thereof.

It is attractive if the average number of zeros or ones from the bit steam converter differs from 50% because discretisation effects then result in higher frequency components which are filtered out by the low-pass filter.

Although there are various possibilities for implementation of a low-pass filter, a convolutional filter has advantages. With such a filter a specific number of incoming samples is always multiplied by coefficients and then accumulated. Since the bit stream contains only the numerals zero and one, this means the coefficients are either added or not added to these samples. This leads to a very simple implementation of the filter, which is a significant advantage of the bit stream method.

The function by means of which convolution is carried out must be symmetrical so that the filter will not give rise to any phase shift. Although there are also various possibilities for the function, including, for example, the trapezium function and Gaussian function, the cosine square function is to be preferred because this function is symmetrical in such a way that the same coefficients are usable four times. This is an implementation advantage, whilst good filter characteristics are nevertheless retained.

Figure 4:
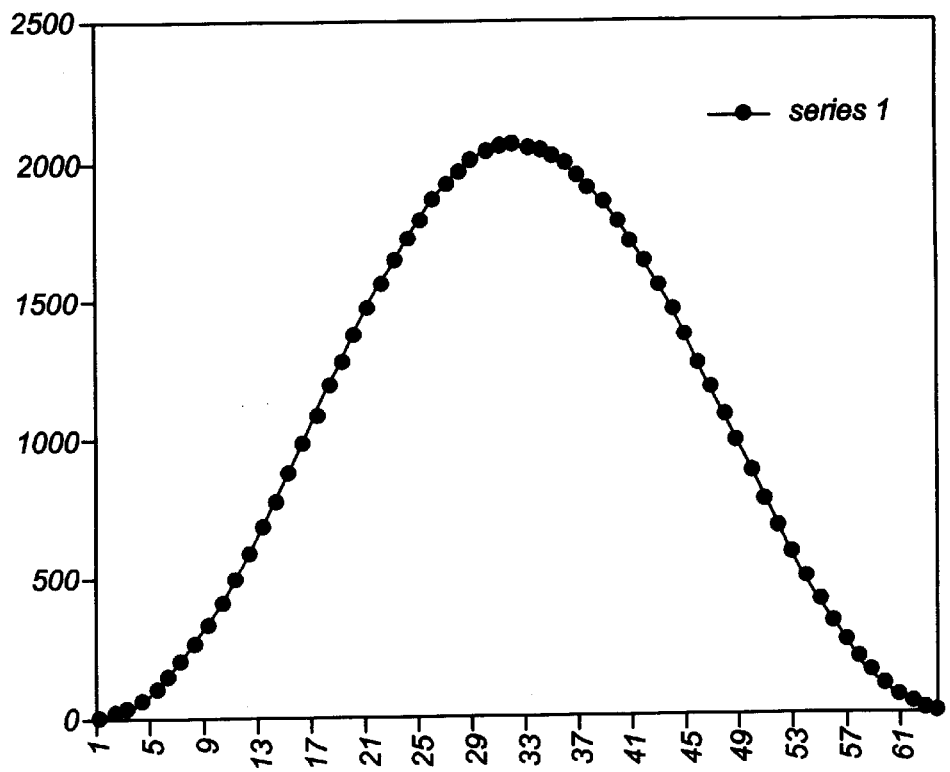
FIG. 4 shows an example of a convolutional filter with a cosine square function.
Figure 5:
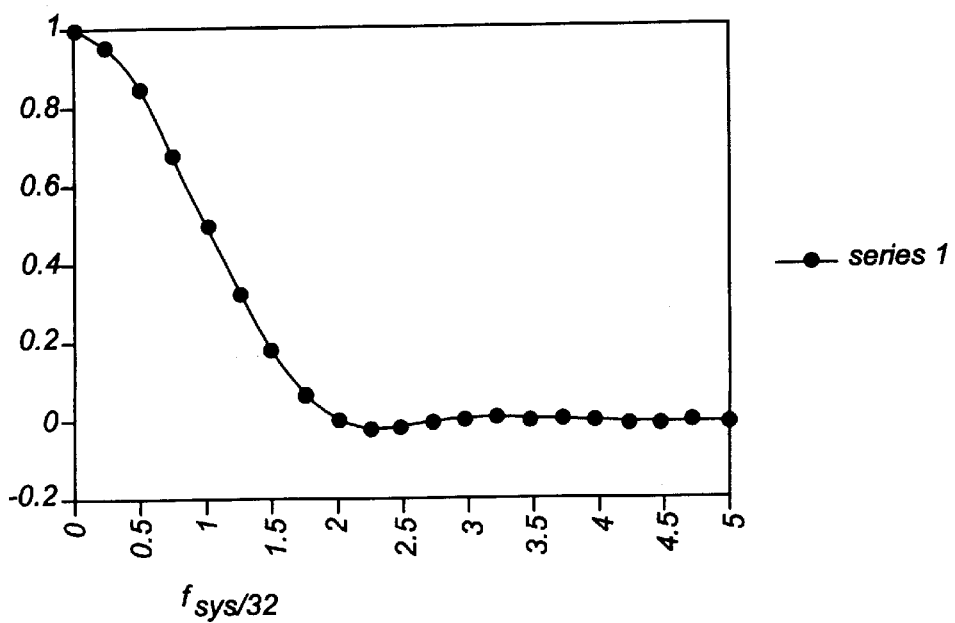
FIG. 5 shows an example of the frequency characteristics of the convolutional filter.

The length of the filter is, for example, fixed at 64 samples. The coefficients of the filter are plotted in FIG. 4. The −6 dB point of the filter is located precisely at $f_{sys}/32$ (system frequency divided by 32). As has been stated, the filter does not introduce any phase shift and has steep characteristics between the −6 dB point and $f_{sys}/16$. The ripple is restricted to −31 dB. See also FIG. 5.

The output signal from the high-pass filter 8 is fed to the device 6, which derives the transitions in the barcode from said output signal.

What is claimed is:

1. Optical device for reading and decoding bars of different reflectivity arranged in accordance with a barcode and adjoining one another, comprising an optical scanning device for scanning the bars by means of a light beam, a sensor for receiving the reflected light beam and the conversion thereof into an electrical sensor output signal, a transition detector for detecting the level transitions in the sensor output signal and a decoding device which decodes the scanned barcode on the basis of the output signals from the transition detector, characterised in that the transition detector is provided with a comparator (2) and a flipflop (3) connected to the output thereof, the sensor output signal being fed to one of the inputs of the comparator and the output of the flipflop being coupled via one or more first integrators (4) to the other input of the comparator, one or more second integrators (5) connected to the output of the flipflop and a device (6), connected to said second integrators, for determining the positions of the transitions in the barcode.

2. Optical device according to claim 1, characterised in that the second integrators are of digital design.

3. Optical device according to claim 1, characterised in that the number of first integrators is equal to the number of second integrators, a first derivative signal being generated from the ultimate output signal of the second integrators and the positions of the transitions in the barcode being determined from the maxima and minima thereof.

4. Optical device according to claim 1, characterised in that two first integrators and one second integrator are present, the positions of the transitions in the barcode being determined from the maxima and minima of the output signal from the second integrator.

5. Optical device according to claim 1, characterised in that the sensor output signal is fed to the comparator via a first derivative device which generates a first derivative signal from the sensor output signal.

6. Optical device according to claim 1, charcterised in that, when more than one integrator is used, a summing device is incorporated with one of its inputs and output between every two first integrators and in that the other input of the summing device is connected to the output of the flipflop.

7. Optical device according to one of claim 1, characterised in that the number of second integrators is a component of a high-pass filter.

8. Optical device according to claim 7, characterised in that the high-pass filter is of the third order.

9. Optical device according to claim 8, characterised in that the high-pass filter is of the Butterworth type.

10. Optical device according to one of claim 1, characterised in that a low-pass filter is incorporated in front of the second integrators.

11. Optical device according to claim 7, characterised in ht a low-pass filter is incorporated in front of the high-pass filter.

12. Optical device according to claim 10, characterised in that the low-pass filter is a convolutional filter.

13. Optical device according to claim 12, characterised in that the convolutional function is a cosine square function.

* * * * *